United States Patent
Nawa et al.

(10) Patent No.: US 7,820,044 B2
(45) Date of Patent: Oct. 26, 2010

(54) FLUID FILTER AND METHOD OF USING SAME

(75) Inventors: Teruyoshi Nawa, Kariya (JP);
Tomohiko Takeuchi, Nagoya (JP);
Toshihiro Takahara, Kariya (JP)

(73) Assignee: Toyota Boshoku Kabushiki Kaisha, Kariya-shi (JP)

( * ) Notice: Subject to any disclaimer, the term of this patent is extended or adjusted under 35 U.S.C. 154(b) by 1006 days.

(21) Appl. No.: 11/563,066

(22) Filed: Nov. 24, 2006

(65) Prior Publication Data
US 2007/0131607 A1    Jun. 14, 2007

(30) Foreign Application Priority Data
Dec. 5, 2005    (JP) .............................. 2005-351270

(51) Int. Cl.
*B01D 35/157*    (2006.01)
*B01D 35/16*    (2006.01)

(52) U.S. Cl. .................. 210/232; 210/235; 210/248; 210/443; 210/450; 210/767

(58) Field of Classification Search .............. 210/232, 210/248, 235, 443, 450, 767
See application file for complete search history.

(56) References Cited
U.S. PATENT DOCUMENTS

| | | | |
|---|---|---|---|
| 5,814,215 A | 9/1998 | Bruss et al. | |
| 6,569,326 B1 | 5/2003 | Baumann et al. | |
| 6,572,768 B1 | 6/2003 | Cline et al. | |
| 6,706,181 B1 * | 3/2004 | Baumann et al. | 210/236 |
| 6,835,305 B1 | 12/2004 | Baumann et al. | |
| 2004/0232063 A1 * | 11/2004 | Cline et al. | 210/433.1 |
| 2005/0072396 A1 | 4/2005 | Lee | |

FOREIGN PATENT DOCUMENTS

| | | | |
|---|---|---|---|
| DE | 3903675 A | * | 8/1990 |
| EP | 1 031 367 A1 | | 8/2000 |
| EP | 1 159 998 A2 | | 12/2001 |
| EP | 1 254 692 A1 | | 11/2002 |
| EP | 1 477 215 A1 | | 11/2004 |
| EP | 1 479 427 A1 | | 11/2004 |
| JP | 11-33313 | | 2/1999 |
| JP | 11-137917 | | 5/1999 |
| JP | 2003-320206 | | 11/2003 |

* cited by examiner

*Primary Examiner*—Thomas M Lithgow
(74) *Attorney, Agent, or Firm*—Oblon, Spivak, McClelland, Maier & Neustadt, L.L.P.

(57) ABSTRACT

A fluid filter includes a case in which an inflow path, an outflow path, and a drainage path are formed, a cap which is engaged with the case through axial rotation, a biasing device (a coil spring) which biases a filter element housed inside a casing constituted by the case and the cap toward the case side, a rotation restricting device (an abutting portion and a projecting portion) which restricts rotation of the filter element in a fastening direction when the cap is rotated relative to the case in the fastening direction, and a sealing member provided on an axial end surface side of the filter element, which seals the drainage path when the filter element is biased by the biasing device and rotation thereof is restricted by the rotation restricting device.

8 Claims, 4 Drawing Sheets

FLUID FILTER AND METHOD OF USING SAME

The disclosure of Japanese Patent Application No. JP2005-351270 filed on Dec. 5, 2005 including the specification, drawings and abstract is incorporated herein by reference in its entirety.

BACKGROUND OF THE INVENTION

1. Field of the Invention

The present invention relates to a fluid filter and a method of using the fluid filter, and more particularly to a fluid filter having a simple, reasonably-priced structure and a method of using the fluid filter, with which the sealing property of a drainage path can be secured over a long period of normal use and the operability of a fluid drain can be improved during element replacement.

2. Description of the Related Art

In a known conventional oil filter, a filter element is accommodated in a substantially vertical casing constituted by a case and a cap which can be engaged with each other by relative rotation, and when the cap is loosened from the case during element replacement, oil is drained internally from a drainage path provided in the case (see Patent Document 1 and Patent Document 2, for example).

Patent Document 1 discloses a device in which a discharge path 19 (drainage path) formed in the case is provided with an axially movable valve body 5 and a spring 20 which biases the valve body 5 upward. When the cap is fastened to the case, the valve body 5 is pushed downward by an end plate 37 provided on an axial end surface of an element 4, thereby sealing the discharge path 19. On the other hand, when the cap is loosened from the case, the valve body 5 is moved upward by the action of the spring 20 such that the discharge path 19 is opened (see FIG. 2 and so on of Patent Document 1).

Patent Document 2 discloses a device in which a downwardly projecting projection 12 is provided on the bottom surface of a resin case 11 holding an element 8, and a bypass oil path 6 (drainage path) formed in a base 2 is opened and closed by inserting and removing the projection 12 into and out of the bypass oil path 6 (see FIGS. 1, 2, and so on, and the first embodiment of Patent Document 2).

Patent Document 2 also discloses a device in which two O-rings 53 and 54 are provided in a groove portion on the bottom surface of a resin case 51 holding the element 8, and the bypass oil path 6 (drainage path) formed in the base 2 is opened and closed by pressing and separating these O-rings 53 and 54 so as to surround the bypass oil path 6 (see FIG. 3 and so on, and the second embodiment of Patent Document 2).

Patent Document 2 also discloses a device in which a check valve 39 is provided on the bottom surface of a resin case 31 holding the element 8, and the bypass oil path 6 (drainage path) formed in the base 2 is opened and closed by pressing and separating the check valve 39 against and from the bypass oil path 6 (see FIGS. 4, 5, and so on, and the third embodiment of Patent Document 2).

However, in Patent Document 1, the spring 20 is provided for biasing the valve body 5 upward, and therefore the spring 20 must be pushed by the element 4 when the cap is fastened to the case, causing an increase in the fastening load. Moreover, the opening/closing mechanism constituted by the valve body 5 and the spring 20 is provided on the case side, leading to an increase in the number of components and creating a structure which is complicated and expensive. Furthermore, the end plate 37 must be provided for pushing the valve body 5 against the axial end plate of the element 4.

In the first embodiment of Patent Document 2, the projection 12 is inserted into and removed from the drainage path, and hence the projection 12 must be guided toward and inserted into the opening in the drainage path manually by an operator when the cap 1 is fastened to the base 2, and this insertion operation is complicated. Also, oil drainage is begun by loosening the cap 1 from the base 2 such that the engagement therebetween is completely released, and then raising the cap to remove the projection 12 from the drainage path. As a result, oil drainage begins after the engagement between the case and the cap has been released, which may lead to oil spillage and so on.

In the second and third embodiments of Patent Document 2, a sealing member (the O-rings 53 and 54 and the check valve 39) is pressed against the surface of the base 2 to seal the drainage path, but when the cap 1 is fastened to the base 2, the element 4 is turned together with the cap 1 such that the sealing member slides over the surface of the case. This creates wear on the sealing member, making it impossible to secure a drainage path sealing property over a long period of normal use.

Moreover, in the first through third embodiments of Patent Document 2, the protrusion 12, O-rings 53 and 54, and check valve 39 are provided on the element side, and hence the case 11, 51, 31 for holding the element must be provided.

Patent Document 1: Japanese Patent Application Publication No. JP-A-11-137917

Patent Document 2: Japanese Patent Application Publication No. JP-A-11-33313

SUMMARY OF THE INVENTION

The present invention has been designed in consideration of the circumstances described above, and it is an object thereof to provide a fluid filter having a simple, reasonably-priced structure and a method of using the fluid filter, with which the sealing property of a drainage path can be secured over a long period of normal use and operability during element replacement can be improved.

The present invention is as follows.

1. A fluid filter comprising:

a case in which an inflow path, an outflow path, and a drainage path are formed;

a cap which is engaged with said case through axial rotation;

a biasing device which biases a filter element housed inside a casing constituted by said case and said cap toward said case side;

a rotation restricting device which restricts rotation of said filter element in a fastening direction when said cap is rotated relative to said case in said fastening direction; and a sealing member provided on an axial end surface side of said filter element, which seals said drainage path when said filter element is biased by said biasing device and rotation thereof is restricted by said rotation restricting device.

2. The fluid filter according to 1 above, wherein said rotation restricting device comprises:

an abutting portion provided on said sealing member; and a protruding portion provided on a peripheral side of an opening of said drainage path inside said case, against which said abutting portion abuts when said filter element is rotated in said fastening direction.

3. The fluid filter according to 1 above, wherein said sealing member made of an elastic material comprises:
 a flat ring-form first sealing portion which is pressed against an annular surface provided on an outer peripheral side of said outflow path inside said case; and
 a flat plate-form second sealing portion extending in a centrifugal direction from an outer peripheral side of said first sealing portion, which is capable of blocking said opening of said drainage path.

4. The fluid filter according to 2 above, wherein said sealing member made of an elastic material comprises:
 a flat ring-form first sealing portion which is pressed against an annular surface provided on an outer peripheral side of said outflow path inside said case; and
 a flat plate-form second sealing portion extending in a centrifugal direction from an outer peripheral side of said first sealing portion, which is capable of blocking said opening of said drainage path.

5. The fluid filter according to 3 above, wherein said sealing member further comprises a tubular third sealing portion extending axially from a surface of said first sealing portion, which is pressed against an outer peripheral surface of a protective tube portion inside said case.

6. The fluid filter according to 4 above, wherein said sealing member further comprises a tubular third sealing portion extending axially from a surface of said first sealing portion, which is pressed against an outer peripheral surface of a protective tube portion inside said case.

7. The fluid filter according to 5 above, wherein a latch portion which latches a latched portion provided in a central hole in said filter element is provided on an outer peripheral surface side of said third sealing portion.

8. The fluid filter according to 6 above, wherein a latch portion which latches a latched portion provided in a central hole in said filter element is provided on an outer peripheral surface side of said third sealing portion.

9. The fluid filter according to 1 above, further comprising a support body which is supported inside said cap so as to be capable of axial movement and biased toward said case side by said biasing device,
 wherein said support body is inserted into said central hole in said filter element and supports said filter element.

10. The fluid filter according to 1 above, wherein said casing comprises:
 said case, which takes a tubular form having an open top and a closed bottom; and
 said cap, which is disposed on an upper side of said case and takes a tubular form having a closed top and an open bottom.

11. A method of using the fluid filter according to 1 above, wherein, when said cap is rotated relative to said case in said fastening direction, said filter element is biased to said case side by said biasing device and rotation thereof in said fastening direction is restricted by said rotation restricting device, whereby said drainage path is sealed by said sealing member, and when said cap is rotated relative to said case in a loosening direction, a bias applied to said filter element by said biasing device is released, or a biasing force thereof is reduced, and said filter element is rotated in said loosening direction, whereby a seal applied to said drainage path by said sealing member is released.

According to the fluid filter of the present invention, when the cap is rotated relative to the case in the fastening direction to engage the two components, the filter element is biased to the case side by the biasing device and rotation thereof in the fastening direction is restricted by the rotation restricting device, whereby the drainage path is sealed by the sealing member. On the other hand, when the cap is rotated relative to the case in the loosening direction to release the engagement between the two components, the bias applied to the filter element by the biasing device is released, or the biasing force thereof is reduced, and the filter element is rotated in the loosening direction, whereby the seal applied to the drainage path by the sealing member is released. By restricting rotation of the filter element in the fastening direction in this manner such that the drainage path is sealed by the sealing member, situations in which the sealing member slides over the surface of the case can be reduced to the required minimum, thereby suppressing wear on the sealing member and ensuring that the drainage path is sealed reliably over a long period of normal use. Moreover, internal fluid drainage is performed while the cap is rotated relative to the case in the loosening direction, and hence pollution of the peripheral environment caused by fluid spillage can be suppressed. Also, operability during element replacement can be improved. Furthermore, the sealing member is provided integrally with the filter element, and hence situations in which a user forgets to replace the sealing member during element replacement can be prevented.

Further, when the rotation restricting device includes the abutting portion and the protruding portion, the filter element can be positioned accurately in a predetermined rotation restricting position, the drainage path can be sealed by the sealing member more reliably, and the rotation restricting device can be manufactured easily and at low cost.

Also, when the sealing member is made of an elastic material and includes the first sealing portion and the second sealing portion, the annular surface on the outer peripheral side of the outflow path inside the case is sealed by the first sealing portion, and the opening of the drainage path is sealed by the second sealing portion. Hence, with a single sealing member, the inflow path can be sealed from the outflow path and the drainage path can also be sealed.

When the sealing member further includes the third sealing portion, the outer peripheral surface of the protective tube portion inside the case is sealed by the third sealing portion, and hence the inflow path can be sealed from the outflow path more reliably.

Furthermore, when the latch portion is provided on the outer peripheral surface side of the third sealing portion, the latched portion provided in the central hole of the filter element can be latched by the latch portion, and hence the filter element and sealing member can be integrated easily.

When the fluid filter also includes the support body, and the support body is inserted into the central hole in the filter element and supports the filter element, operability during element replacement can be further improved.

Also, when the casing includes the case, which takes a tubular form having an open top and a closed bottom, and the cap, which takes a tubular form having a closed top and an open bottom, fluid drainage from the upwardly vertical casing can be performed favorably.

According to a method of using the fluid filter of the present invention, when the cap is rotated relative to the case in the fastening direction to engage the two components, the filter element is biased to the case side by the biasing device and rotation thereof in the fastening direction is restricted by the rotation restricting device, whereby the drainage path is sealed by the sealing member. On the other hand, when the cap is rotated relative to the case in the loosening direction to release the engagement between the two components, the bias applied to the filter element by the biasing device is released, or the biasing force thereof is reduced, and the filter element is rotated in the loosening direction, whereby the seal applied to the drainage path by the sealing member is released. By restricting rotation of the filter element in the fastening direction in this manner such that the drainage path is sealed by the sealing member, situations in which the sealing member slides over the surface of the case can be reduced to the required minimum, thereby suppressing wear on the sealing member and ensuring that the drainage path is sealed reliably over a long period of normal use. Moreover, internal fluid drainage is performed while the cap is rotated relative to the case in the loosening direction, and hence pollution of the peripheral environment caused by fluid spillage can be suppressed. Also, operability during element replacement can be improved. Furthermore, the sealing member is provided integrally with the filter element, and hence situations in which a user forgets to replace the sealing member during element replacement can be prevented.

DETAILED DESCRIPTION OF THE PREFERRED EMBODIMENT

1. Fluid Filter

Figure 1:
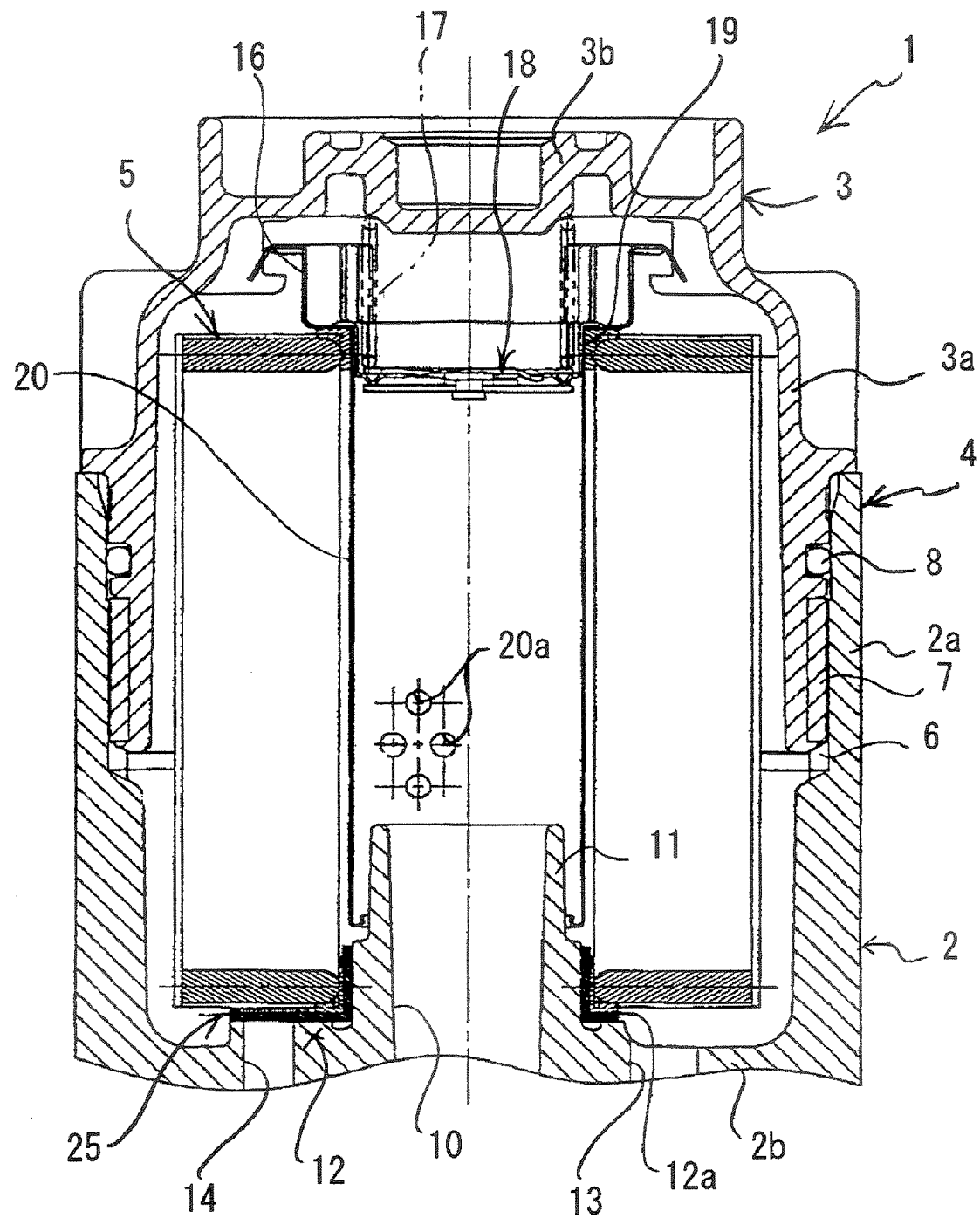
FIG. 1 is a vertical sectional view of an oil filter according to a working example.

A fluid filter according to this embodiment includes a case, a cap, a biasing device, a sealing member, and a rotation restricting device, all of which will be described below. The fluid filter may further include a support body to be described below, for example.

There are no particular limitations on the structure, shape, materials, and so on of the aforementioned "case" as long as an inflow path, an outflow path, and a drainage path are formed therein. For example, the case may take a tubular shape having an open top and a closed bottom.

For example, the inflow path may be formed in a bottom portion of the case and the drainage path may be formed in a thick projecting portion which is thicker than the bottom portion of the case such that an opening of the drainage path is disposed in a higher position than an opening of the inflow path. The drainage path and inflow path may be disposed on the same circumference when seen from above so that the size of the case can be reduced.

There are no particular limitations on the structure, shape, materials, and so on of the aforementioned "cap" as long as it can be engaged with the case through axial rotation. For example, the cap may take a tubular shape having a closed top and an open bottom.

Examples of an engagement mechanism for engaging the cap with the case include (1) a screwing mechanism constituted by male and female screw portions which can be screwed to each other, and (2) a bayonet mechanism constituted by a groove portion and a convex portion which can be attached to and detached from each other.

A filter element to be described below is housed inside a casing constituted by the case and the cap. Note that the casing typically takes an upwardly vertical form (including a diagonally vertical form).

There are no particular limitations on the structure, shape, materials, and so on of the aforementioned "filter element". Examples of the filter element include (1) an aspect constituted by an element main body, and (2) an aspect constituted by an element main body and a holding frame for holding the element main body. The aspect described in (1) is preferable from the viewpoints of simplicity and cost. Examples of the material of the filter element include nonwoven fabric, woven fabric, and paper.

Note that a sealing layer for separating the inflow path from the outflow path in the interior of the casing may be provided on an upper end surface side and a lower end surface side of the filter element. The sealing layer may be constituted by an elastic material such as resin (in particular, photo-setting resin), rubber, elastomer, and metal, for example.

There are no particular limitations on the structure, material, and so on of the aforementioned "biasing device" as long as it is capable of biasing the filter element housed inside the casing toward the case side. The biasing device may be provided inside the cap, for example. Examples of the biasing device include an elastic member such as a rubber or a spring, and a shock-absorbing mechanism. Examples of the spring include a coil spring, a disc spring, and a plate spring.

There are no particular limitations on the structure, restriction method, timing, and so on of the aforementioned "rotation restricting device" as long as it is capable of restricting rotation of the filter element in a fastening direction when the cap is rotated relative to the case in the fastening direction. The rotation restricting device is typically provided between the case and the filter element. Having been subjected to rotation restriction by the rotation restricting device, the filter element is positioned in a predetermined rotation restriction position (C) (see FIG. 3 and so on).

For example, the rotation restricting device may be constituted by an abutting portion provided on the filter element, and a projecting portion provided in the case, against which the abutting portion abuts when the filter element is rotated in the fastening direction. To ensure that the filter element can be positioned in the rotation restriction position more accurately, the abutting portion is preferably provided on an axial end surface side of the filter element and the projecting portion is preferably provided on an inner bottom surface side of the case. Particularly preferably, the abutting portion is provided integrally with the aforementioned sealing member, and the projecting portion is provided on a peripheral side of the opening of the drainage path.

There are no particular limitations on the structure, shape, materials, and so on of the aforementioned "sealing member" as long as it is provided on the axial end surface side of the filter element and is capable of sealing the drainage path when the filter element is biased to the case side by the biasing device and rotation of the filter element is restricted by the rotation restricting device. For example, the sealing member may be constituted by an elastic material such as rubber, elastomer, resin (in particular, photo-setting resin), and metal.

For example, when the cap is rotated relative to the case in a loosening direction such that the bias applied to the filter element by the biasing device is released, or the biasing force thereof is reduced, the sealing member can release the seal on the drainage path.

Examples of the sealing member include: (1) an aspect constituted by a flat plate-form sealing portion which is capable of blocking the opening in the drainage path from above; (2) an aspect constituted by: a flat ring-form first sealing portion which is pressed against an annular surface formed in the case; and a flat plate-form second sealing portion extending in a centrifugal direction from an outer peripheral side of the first sealing portion, which is capable of blocking the opening in the drainage path from above; and (3) an aspect constituted by: a flat ring-form first sealing portion which is pressed against an annular surface formed in the case; a flat plate-form second sealing portion extending in a centrifugal direction from an outer peripheral side of the first sealing portion, which is capable of blocking the opening in the drainage path from above; and a tubular third sealing portion extending axially from the surface of the first sealing portion, which is pressed against the outer peripheral surface of a protective tube portion formed in the case.

Figure 2:
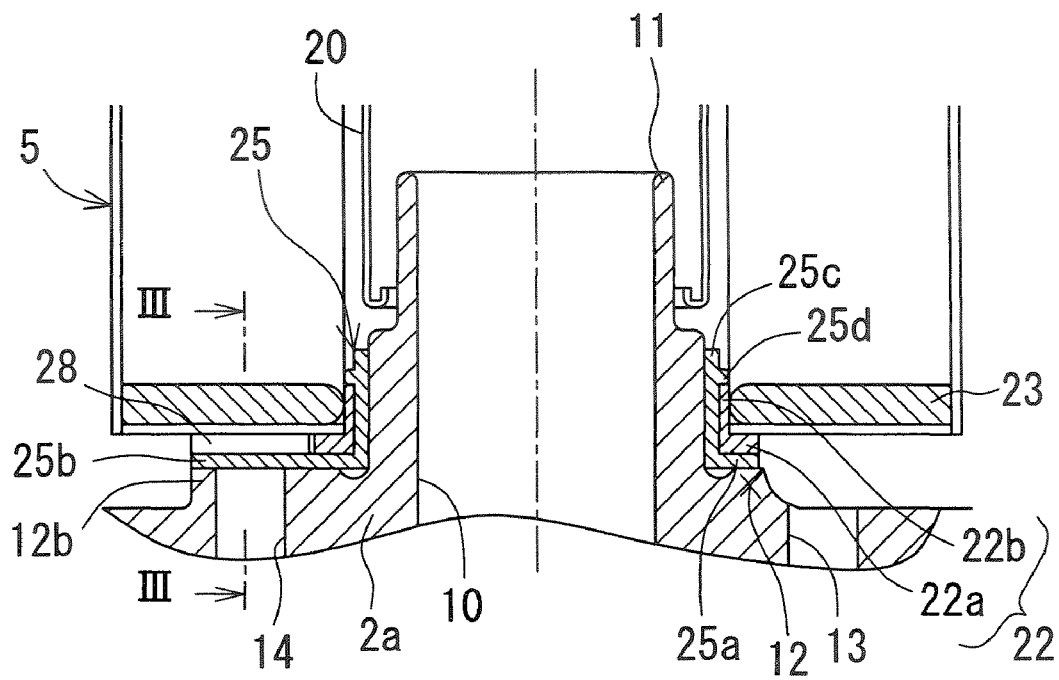
FIG. 2 is an enlarged view of a main portion of FIG. 1.

With the aspects described in (1) through (3), the sealing member can be adhered and fixed to the axial end surface side of the filter element using an adhesive or the like. When a sealing member constituted by a photo-setting resin is employed, the sealing member can be fixed without an adhesion process. Further, with the aspect described in (3), the sealing member can be fixed by inserting (pressing or the like, for example) the third sealing portion of the sealing member into a central hole in the filter element. Moreover, with the aspect described in (3), a latch portion for latching a latched portion (for example, as shown in FIG. 2, the second sealing portion 22b of the sealing layer 22 described above or the like) provided in the central hole in the filter element is preferably provided on the outer peripheral surface side of the third sealing portion.

There are no particular limitations on the structure, shape, material, and so on of the aforementioned "support body" as long as it is supported to be capable of axial movement within the cap and biased toward the case side by the biasing device. The support body in inserted into the central hole in the filter element and supports the filter element.

2. Method of Using Fluid Filter

In a method of using the fluid filter according to the embodiment described above, when the cap is rotated relative to the case in the fastening direction, the filter element is biased to the case side by the biasing device and rotation thereof in the fastening direction is restricted by the rotation restricting means, whereby the drainage path is sealed by the sealing member. When the cap is rotated relative to the case in the loosening direction, the bias applied to the filter element by the biasing device is released, or the biasing force thereof is reduced, such that the filter element is rotated in the loosening direction. As a result, the seal applied to the drainage path by the sealing member is released.

Working Example

Hereinafter, a working example of the present invention will be described in detail with reference to the drawings.

Note that in this working example, an oil filter of an internal combustion engine is cited as an example of the "fluid filter" according to the present invention.

(1) Structure of Oil Filter

As shown in FIG. 1, an oil filter 1 according to this working example includes: a case 2 that takes a tubular form having an open top and a closed bottom that attached to a cylinder block (not shown) of an internal combustion engine; and a cap 3 that takes a tubular form having a closed top and an open bottom and that is screwed to the case 2 by axial rotation. A filter element 5 (also referred to simply as "element" hereafter) formed by folding filter paper into the shape of a chrysanthemum flower is housed inside a casing 4 constituted by the case 2 and the cap 3.

A female screw 6 is formed on the inner peripheral side of a tube portion 2a of the case 2. A male screw 7 is formed on the outer peripheral side of a tube portion 3a of the cap 3, and an O-ring 8 is attached to the outer peripheral side. By screwing the female screw 6 and male screw 7 together such that the case 2 and cap 3 are engaged via the O-ring 8, the interior of the casing 4 is set in a fluid-tight state.

Figure 4:
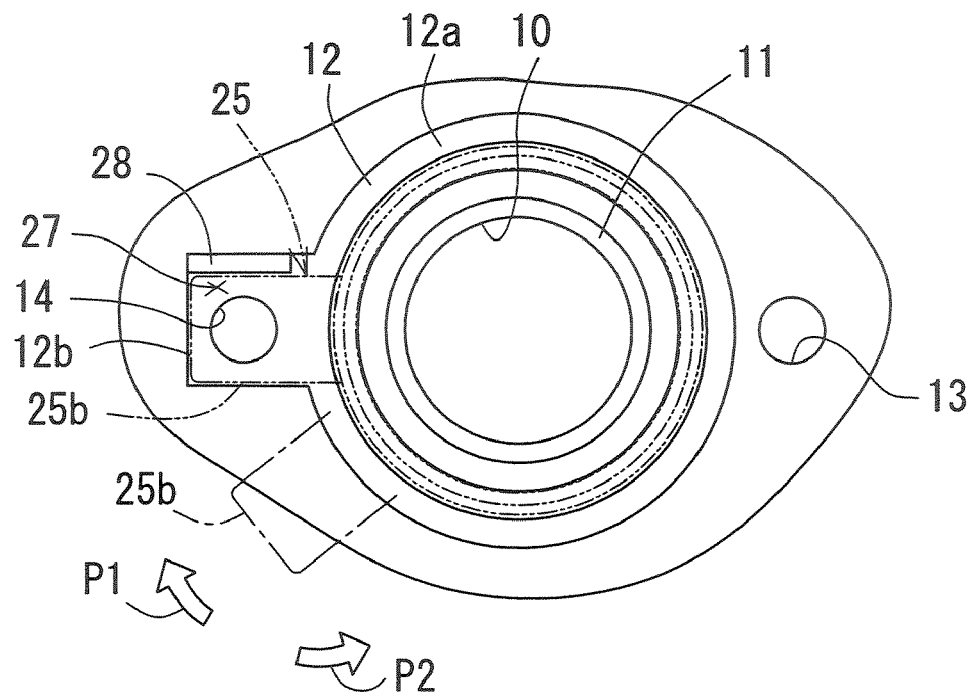
FIG. 4 is a plan view of a case.

As shown in FIGS. 2 and 4, an outflow path 10 for draining filtered oil is formed in the center of a bottom portion 2b of the case 2. Further, a protective tube portion 11 into which the element 5 is fitted via a sealing member to be described below is formed on the peripheral side of the outflow path 10 of the case 2, and a thick portion 12 is formed on the peripheral side of the protective tube portion 11. An upper face of the thick portion 12 serves as an annular surface 12a against which the sealing member to be described below is pressed. Further, an inflow path 13 for introducing unfiltered oil and a drainage path 14 for internally draining the oil in the casing 4 during element replacement are formed on the same circumference on the peripheral side of the protective tube portion 11 of the case 2. The drainage path 14 opens onto the surface of a projecting portion 12b which extends in a centrifugal direction from the outer peripheral side of the thick portion 12, and the opening in the drainage path 14 is positioned higher than the opening in the inflow path 13.

Note that a check valve may be provided on the inflow path 13 of the case 2 to prevent backflow of the oil when the internal combustion engine is inoperative or the like.

As shown in FIG. 1, a hat-shaped metallic support member 16 is supported on a top portion 3b of the cap 3 so as to be capable of axial movement. A coil spring 17 (serving as an example of the "biasing device" according to the present invention) for biasing the support member 16 downward is interposed between the support member 16 and the top portion 3b of the cap 3. Further, a relief valve 18 for letting out oil when the pressure of the inflowing oil increases excessively is provided on the support member 16. Also, a protective tube portion 19 into which the element 5 is fitted via a sealing layer to be described below is formed on the support member 16. Further, one end side of a cylindrical protector 20 (serving as an example of the "support body" according to the present invention) having a large number of through holes 20a formed in its outer peripheral surface is fixed to the support member 16 by adhesion or the like.

As shown in FIG. 2, a sealing layer 22 made of photo-setting resin for separating the inflow path 13 from the outflow path 10 is provided on both of the axial end surface sides of the element 5, and an adhesive layer 23 is also provided for adhering the axial end sides of the element 5 to each other The sealing layer 22 is constituted by a first sealing portion 22a which contacts the axial end surface of the element 5, and a second sealing portion 22b which extends from the first sealing portion 22a and contacts the inner peripheral surface of the central hole in the element 5. When the protector 20 is inserted into the element 5, the sealing layer 22 is pressed against the protective tube portion 19 of the support member 16 such that the element 5 is supported integrally with the protector 20.

Note that in this working example, the sealing layer 22 on one of the axial end sides functions as a site for attaching the sealing member to be described below.

Figure 5:
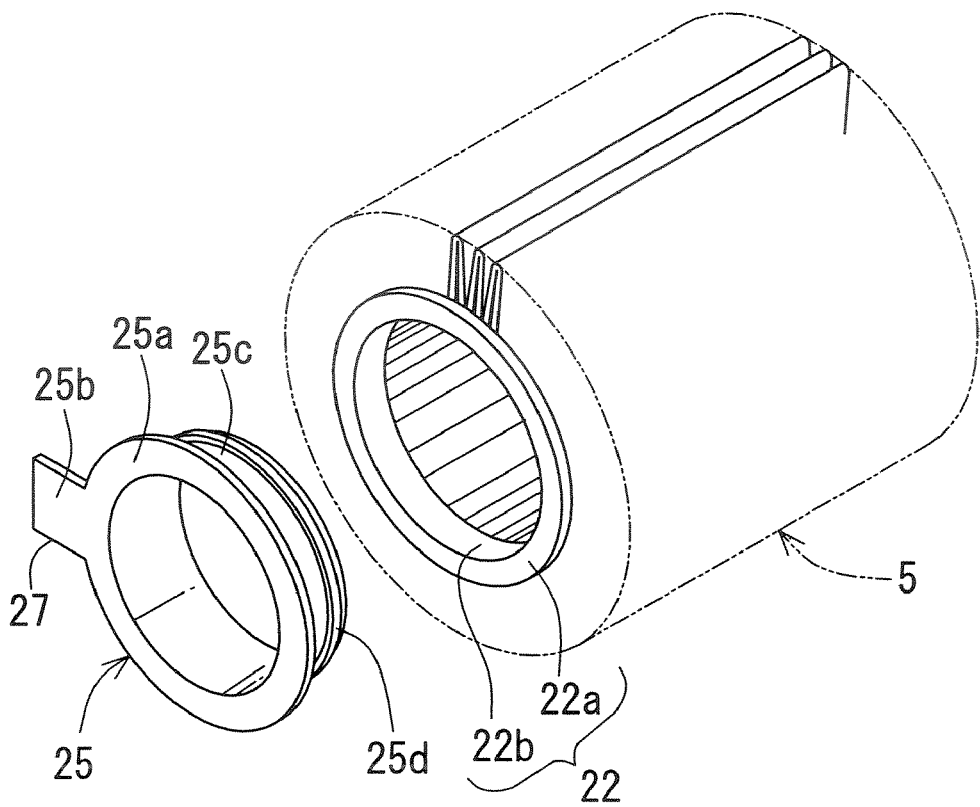
FIG. 5 is a perspective view of a filter element.

As shown in FIGS. 2 and 5, a rubber sealing member 25 for sealing the opening of the drainage path 14 in the case 2 is provided on one of the axial end surface sides of the element 5. The sealing member 25 is constituted by: a flat ring-form first sealing portion 25a which is pressed against the annular surface 12a of the case 2; a rectangular flat plate-form second sealing portion 25b which extends in a centrifugal direction from the outer peripheral side of the first sealing portion 25a and is capable of blocking the opening in the drainage path 14 from above; and a tubular third sealing portion 25c which extends axially from the surface of the first sealing portion 25a and is pressed against the outer peripheral surface of the protective tube portion 11 of the case 2. The third sealing portion 25c has a shape enabling insertion into the central hole in the element 5. Further, a ring-form convex portion 25d (serving as an example of the "latch portion" according to the present invention) which is fitted into an end portion of the second sealing portion 22b (serving as an example of the "latched portion" according to the present invention) of the sealing layer 22 is provided on the outer peripheral surface side of the third sealing portion 25c.

Figure 3:
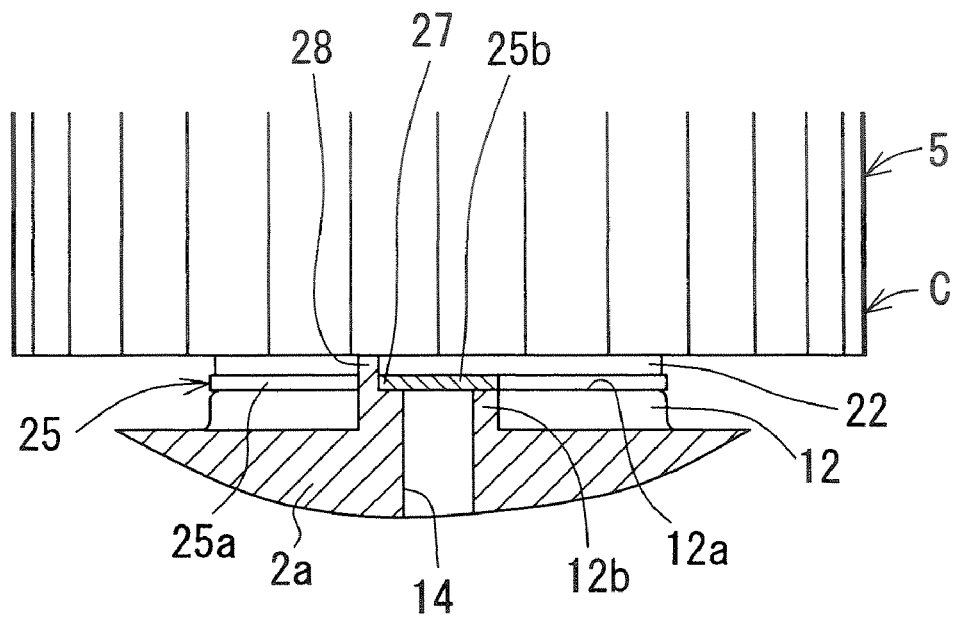
FIG. 3 is a sectional view taken along a line III-III in FIG. 2.

As shown in FIGS. 3 and 4, an abutting portion 27 is provided on a side surface portion of the second sealing portion 25b of the sealing member 25. Further, an upwardly-projecting, wall-shaped protruding portion 28 is provided on the projecting portion 12b of the case 2. When the cap 3 is rotated relative to the case 2 in a fastening direction P1, the abutting portion 27 of the element 5, which rotates together with the cap 3, abuts against the protruding portion 28, whereby the element 5 is positioned in a rotation restricting position C (see FIG. 3) in which the opening of the drainage path 14 is sealed by the second sealing portion 25b.

Here, the abutting portion 27 and protruding portion 28 may be considered to constitute the "rotation restricting device" according to the present invention.

(2) Operation of the Oil Filter

Next, the operation of the above oil filter 1 will be described.

Figure 6:
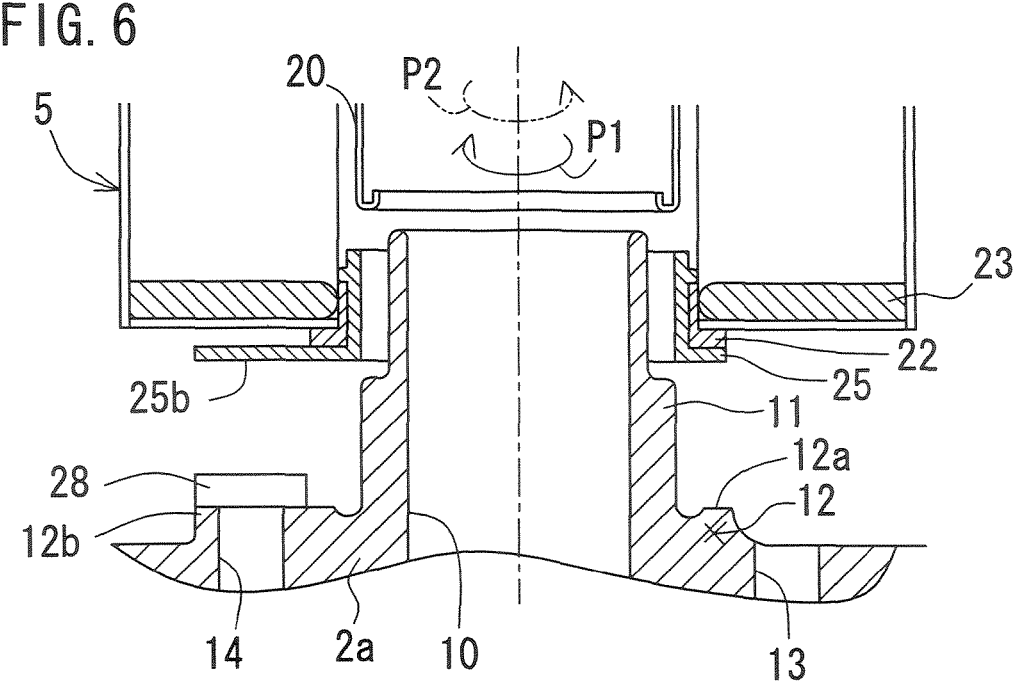
FIG. 6 is an illustrative view illustrating the operation of the oil filter.

First, the protector 20 of the cap 3 is inserted into the element 5 and supports the filter element 5, and with the sealing member 25 of the element 5 facing the case 2 side, the cap 3 is rotated relative to the case 2 in the fastening direction P1 (see FIG. 6). As a result, the element 5 rotates together with the cap 3 in the fastening direction P1, and as this rotation progresses, the element 5 is biased to the case 2 side by the compressed coil spring 17. As the rotation progresses further, the abutting portion 27 provided on the sealing member 25 abuts against the protruding portion 28 of the case 2 such that the element 5 is subjected to rotation restriction and positioned in the rotation restricting position C. Thus, the annular surface 12a of the case 2 is sealed by the first sealing portion 25a of the sealing member 25, the opening of the drainage path 14 is sealed by the second sealing portion 25b, and the outer peripheral surface of the protective tube portion 11 of the case 2 is sealed by the third sealing portion 25c.

When the cap 3 is rotated relative to the case 2 in a loosening direction P2 during element replacement, the coil spring 17 extends such that the bias on the element 5 is released, or the biasing force thereof is reduced, and the element 5 is rotated in the loosening direction P2 together with the cap 3. As a result, the seal applied to the drainage path 14 by the second sealing portion 25b of the sealing member 25 is released (see the dot-dash line in FIG. 4), and the oil remaining in the casing 4 is drained internally through the drainage path 14.

(3) Effects of the Working Example

With the oil filter 1 of this working example, when the cap 3 is rotated relative to the case 2 in the fastening direction P1, rotation of the element 5 in the fastening direction P1 is restricted such that the element 5 is positioned in the rotation restricting position C and the drainage path 14 is sealed by the second sealing portion 25b of the sealing member 25. Therefore, sliding of the sealing member 25 along the surface of the case 2 is almost completely eliminated, and wear on the sealing member 25 can be suppressed. Hence, in comparison with the related art (the second and third embodiments and so on of Japanese Patent Document 2), in which the drainage path is sealed by causing the sealing member to slide on the surface of the case over a long period of time, the ability to seal the drainage path 14 can be maintained over a long period of normal use.

Further, with the oil filter 1 of this working example, during rotation of the cap 3 relative to the case 2 in the loosening direction P2, the biasing force applied to the element 5 by the coil spring 17 is released or weakened such that the element 5 rotates in the loosening direction P2 together with the cap 3. As a result, the seal applied to the opening of the drainage path 14 by the second sealing portion 25b of the sealing member 25 is released such that oil drainage can begin. Therefore, in comparison with the related art (the first embodiment and so on of Patent Document 2), in which oil drainage begins when the screw engagement between the cap and case is released completely and the cap is lifted up to release the seal applied to the drainage path opening, the start timing of oil drainage can be expedited, pollution of the peripheral environment caused by fluid spillage can be suppressed, and operability during element replacement can be improved. Moreover, in comparison with the related art (Patent Document 1 and so on), in which a drainage path opening/closing mechanism having a complicated and expensive structure is provided, the number of components can be reduced, and a filter having a simple and reasonably-priced structure can be provided.

Further, in this working example the sealing member 25 is provided integrally with the filter element 5, and hence situations in which a user forgets to replace the sealing member 25 during element replacement can be prevented. Moreover, the filter element 5 and sealing member 25 can be disposed of simultaneously.

Also in this working example, the rotation restricting device is constituted by the abutting portion 27 provided on the side surface side of the sealing member 25, and the protruding portion 28 provided in the vicinity of the opening of the drainage path 14 inside the case 2. As a result, the element 5 can be positioned accurately in the rotation restricting position C, and the rotation restricting device can be manufactured easily and at low cost.

Also in this working example, the rubber sealing member is constituted by the first sealing portion 25a, the second sealing portion 25b, and the third sealing portion 25c, and therefore, a single sealing member is capable of exhibiting a function for sealing the inflow path 13 from the outflow path 10 and a function for sealing the drainage path 14. Moreover, the sealing member can be manufactured easily and at low cost.

Furthermore, in this working example the convex portion 25d which fits into the sealing layer 22 of the element 5 is provided on the outer peripheral side of the third sealing portion 25c, and therefore the element 5 and sealing member 25 can be integrated easily.

Also in this working example, the element 5 is inserted into and supported by the protector 20 of the cap 3, and hence operability during element replacement can be improved.

Also in this working example, the drainage path 14 and inflow path 13 are disposed on the same circumference when seen from above such that the opening of the drainage path 14 is positioned higher than the opening of the inflow path 13. In so doing, the size of the case 2 can be reduced.

Figure 7:
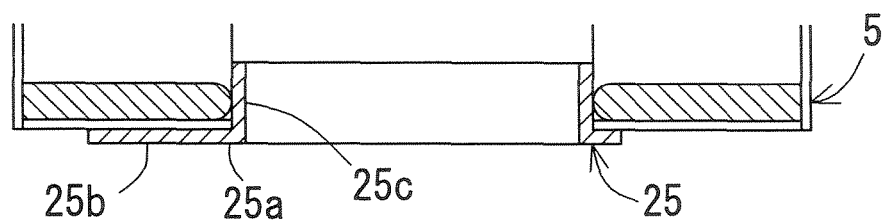
FIG. 7 is a vertical sectional view showing the main portion of another aspect of the filter element.

Note that the present invention is not limited to the working example described above, and may be subjected to various modifications within the scope of the present invention depending on the objects and applications thereof. More specifically, in the working example described above the sealing member 25 is attached so as to fit into the sealing layer 22 of the filter element 5, but the present invention is not limited thereto, and for example, as shown in FIG. 7, the sealing member 25 may be directly fixed to the filter element 5 by an adhesive or the like without employing the sealing layer. Alternatively, the sealing member 25 may be constituted by a photo-setting resin and provided directly on the filter element 5 thereby.

Figure 8:
FIG. 8 is a vertical sectional view showing the main portion of a further aspect of the filter element.
Figure 9:
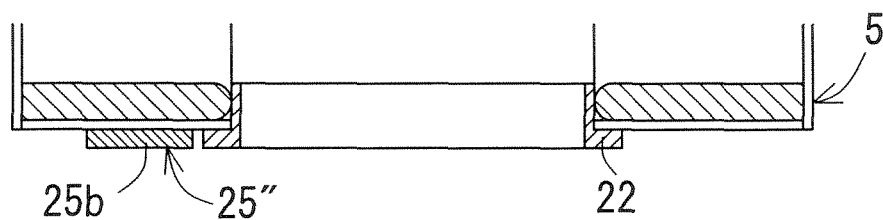
FIG. 9 is a vertical sectional view showing the main portion of a further aspect of the filter element.

Further, in the working example described above the sealing member 25 is constituted by the first sealing portion 25a, the second sealing portion 25b, and the third sealing portion 25c, but the present invention is not limited thereto, and for example, a sealing member 25' constituted by the first sealing portion 25a and the second sealing portion 25b may be provided as shown in FIG. 8, or a sealing member 25" constituted by the second sealing portion 25b alone may be provided as shown in FIG. 9.

Further, in the working example described above, the abutting portion 27 is provided integrally with the sealing member 25, but the present invention is not limited thereto, and for example, the abutting portion 27 may be provided on the filter element 5 separately from the sealing member 25.

Moreover, in the working example described above, the abutting portion 27 is provided on the axial end surface side of the filter element 5, and the protruding portion 28 is provided on the surface side of the bottom portion 2b of the case 2, but the present invention is not limited thereto, and for example, the abutting portion 27 may be provided on the outer peripheral surface side of the filter element 5 and the protruding portion 28 may be provided on the inner peripheral side of the tube portion 2a of the case 2.

The present invention may be used widely as a technique for filtering a fluid. The present invention may be employed particularly favorably as an upwardly vertical oil filter for an internal combustion engine.

What is claimed is:

1. A fluid filter comprising:
   a filter element;
   a case in which an inflow path, an outflow path, and a drainage path are formed, the case including a protruding portion provided on a peripheral side of an opening of said drainage path;
   a cap which is engaged with said case through axial rotation;
   a biasing device which biases the filter element housed inside a casing constituted by said case and said cap toward said case side;
   a rotation restricting device which restricts rotation of said filter element in a fastening direction when said cap is rotated relative to said case in said fastening direction; and
   a sealing member provided on an axial end surface side of said filter element, which seals said drainage path when said filter element is biased by said biasing device and rotation thereof is restricted by said rotation restricting device,
   wherein said sealing member includes a flat plate-form sealing portion capable of blocking said opening of said drainage path,
   wherein said rotation restricting device includes the protruding portion provided on said case and an abutting portion provided on a side surface portion of said flat plate-form sealing portion, the abutting portion abuts said protruding portion when said filter element is rotated in said fastening direction,
   wherein said cap supports said filter element such that said filter element rotates together with said cap in a loosening direction thereof, thereby releasing the seal applied to said drainage path by said flat plate-form sealing portion.

2. The fluid filter according to claim 1, wherein said sealing member made of an elastic material comprises:
   a flat ring-form first sealing portion which is pressed against an annular surface provided on an outer peripheral side of said outflow path inside said case; and
   a flat plate-form second sealing portion extending in a centrifugal direction from an outer peripheral side of said first sealing portion, which is capable of blocking said opening of said drainage path.

3. The fluid filter according to claim 2, wherein said sealing member further comprises a tubular third sealing portion extending axially from a surface of said first sealing portion, which is pressed against an outer peripheral surface of a protective tube portion inside said case.

4. The fluid filter according to claim 3, wherein a latch portion which latches a latched portion provided in a central hole in said filter element is provided on an outer peripheral surface side of said third sealing portion.

5. The fluid filter according to claim 1, further comprising a support body which is supported inside said cap so as to be capable of axial movement and biased toward said case side by said biasing device,
   wherein said support body is inserted into said central hole in said filter element and supports said filter element.

6. The fluid filter according to claim 1, wherein said casing comprises:
   said case, which takes a tubular form having an open top and a closed bottom; and
   said cap, which is disposed on an upper side of said case and takes a tubular form having a closed top and an open bottom.

7. The fluid filter according to claim 1, wherein an opening for the drainage path is positioned closer to the filter element than an opening for the inflow path in the longitudinal direction of the case.

8. A method of using the fluid filter according to claim 1, wherein, when said cap is rotated relative to said case in said fastening direction, said filter element is biased to said case side by said biasing device and rotation thereof in said fastening direction is restricted by said rotation restricting device, whereby said drainage path is sealed by said sealing member, and when said cap is rotated relative to said case in a loosening direction, a bias applied to said filter element by said biasing device is released, or a biasing force thereof is reduced, and said filter element is rotated in said loosening direction, whereby a seal applied to said drainage path by said sealing member is released.

* * * * *